United States Patent
Godinez et al.

(10) Patent No.: US 11,520,849 B2
(45) Date of Patent: Dec. 6, 2022

(54) EDGE CACHE STATIC ASSET OPTIMIZATION

(71) Applicant: BBY SOLUTIONS, INC., Richfield, MN (US)

(72) Inventors: Sean Godinez, Woodbury, MN (US); David Adolphson, Apple Valley, MN (US); Praveen Kotla, Apple Valley, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 0 days.

(21) Appl. No.: 17/382,970

(22) Filed: Jul. 22, 2021

(65) Prior Publication Data

US 2021/0390155 A1 Dec. 16, 2021

Related U.S. Application Data

(63) Continuation of application No. 16/664,251, filed on Oct. 25, 2019, now Pat. No. 11,074,315.

(60) Provisional application No. 62/869,717, filed on Jul. 2, 2019.

(51) Int. Cl.
*G06F 16/957* (2019.01)
*G06F 16/958* (2019.01)

(52) U.S. Cl.
CPC ...... *G06F 16/9577* (2019.01); *G06F 16/9574* (2019.01); *G06F 16/986* (2019.01)

(58) Field of Classification Search
CPC . G06F 16/9577; G06F 16/986; G06F 16/9574
USPC ....................................................... 715/234
See application file for complete search history.

(56) References Cited

U.S. PATENT DOCUMENTS

| | | |
|---|---|---|
| 6,330,592 B1 | 12/2001 | Makuch et al. |
| 6,591,266 B1 | 7/2003 | Li et al. |
| 7,188,216 B1 | 3/2007 | Rajkumar et al. |
| 7,200,681 B1 | 4/2007 | Lewin et al. |
| 8,112,471 B2 | 2/2012 | Wei et al. |
| 10,261,938 B1 | 4/2019 | Jenkins et al. |
| 2002/0065899 A1 | 5/2002 | Smith et al. |
| 2002/0188694 A1 | 12/2002 | Yu |

(Continued)

FOREIGN PATENT DOCUMENTS

CN 109634654 A * 4/2019

OTHER PUBLICATIONS

"U.S. Appl. No. 16/664,251, Non Final Office Action dated Nov. 30, 2020", 9 pgs.

(Continued)

*Primary Examiner* — Stephen S Hong
*Assistant Examiner* — Broderick C Anderson
(74) *Attorney, Agent, or Firm* — Schwegman Lundberg & Woessner, P.A.

(57) ABSTRACT

Systems and techniques for edge cache static asset optimization are described herein. A set of tracking instructions may be generated for execution at an edge cache server of the content delivery system. A static asset may be identified that is included in a webpage delivery session. A type may be determined for the static asset. The static asset may be grouped with a set of other static assets based on the type. The webpage request may be processed by processing the static asset. The set of tracking instructions may be transmitted to an edge cache server for storage in an edge cache of an edge network.

21 Claims, 5 Drawing Sheets

(56) References Cited

U.S. PATENT DOCUMENTS

| | | | |
|---|---|---|---|
| 2008/0065718 A1 | 3/2008 | Todd et al. | |
| 2009/0150518 A1 | 6/2009 | Lewin et al. | |
| 2009/0327512 A1 | 12/2009 | Chapweske | |
| 2012/0303697 A1 | 11/2012 | Alstad | |
| 2013/0332814 A1 | 12/2013 | Marlow | |
| 2015/0154163 A1* | 6/2015 | Gogineni | G06F 40/174 715/229 |
| 2015/0180733 A1 | 6/2015 | Krutzler et al. | |
| 2015/0207888 A1 | 7/2015 | Swanson et al. | |
| 2021/0004427 A1 | 1/2021 | Godinez et al. | |

OTHER PUBLICATIONS

"U.S. Appl. No. 16/664,251, Notice of Allowance dated Mar. 24, 2021", 8 pgs.

"U.S. Appl. No. 16/664,251, Response filed Mar. 1, 2021 to Non Final Office Action dated Nov. 30, 2020", 10 pgs.

Goossens, Frank, "Autoptimize", [online], [archived on Feb. 14, 2019]. Retrieved from the Internet: <URL: https://web.archive.org/web/20190214155508/https://wordpress.org/plugins/autoptimize/>, (Feb. 14, 2019), 6 pgs.

\* cited by examiner

EDGE CACHE STATIC ASSET OPTIMIZATION

RELATED APPLICATIONS

This application is a continuation of U.S. patent application Ser. No. 16/664,251, filed Oct. 25, 2019, which claims the benefit of priority to U.S. Provisional Application Ser. No. 62/869,717, filed Jul. 2, 2019, which is incorporated herein by reference in its entirety.

TECHNICAL FIELD

Embodiments described herein generally relate to caching web content at an edge network and, in some embodiments, more specifically to static asset content optimization in an edge network cache.

BACKGROUND

Webpage content may be provided by a webserver. Webpage visitors may access the web content from around the world. Caching webpage content on edge servers closer to the visitors, such as at a content delivery network (CDN), may increase the speed of rendering webpages and may reduce the processing cost of serving webpages by reducing the load on the webserver and reducing the distance or the number of network hops/routers that the content traverses. However, a webpage may include a variety of static assets (e.g., images, text, multimedia, JAVASCRIPT®, cascading style sheets (CSS), etc.) or static asset references that may be called and downloaded. Reloading the static assets multiple times may slow page rendering and delivery. The order in which static assets (or references to static assets) are presented in a webpage and processed may also have an impact of actual or perceived page load time for a user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
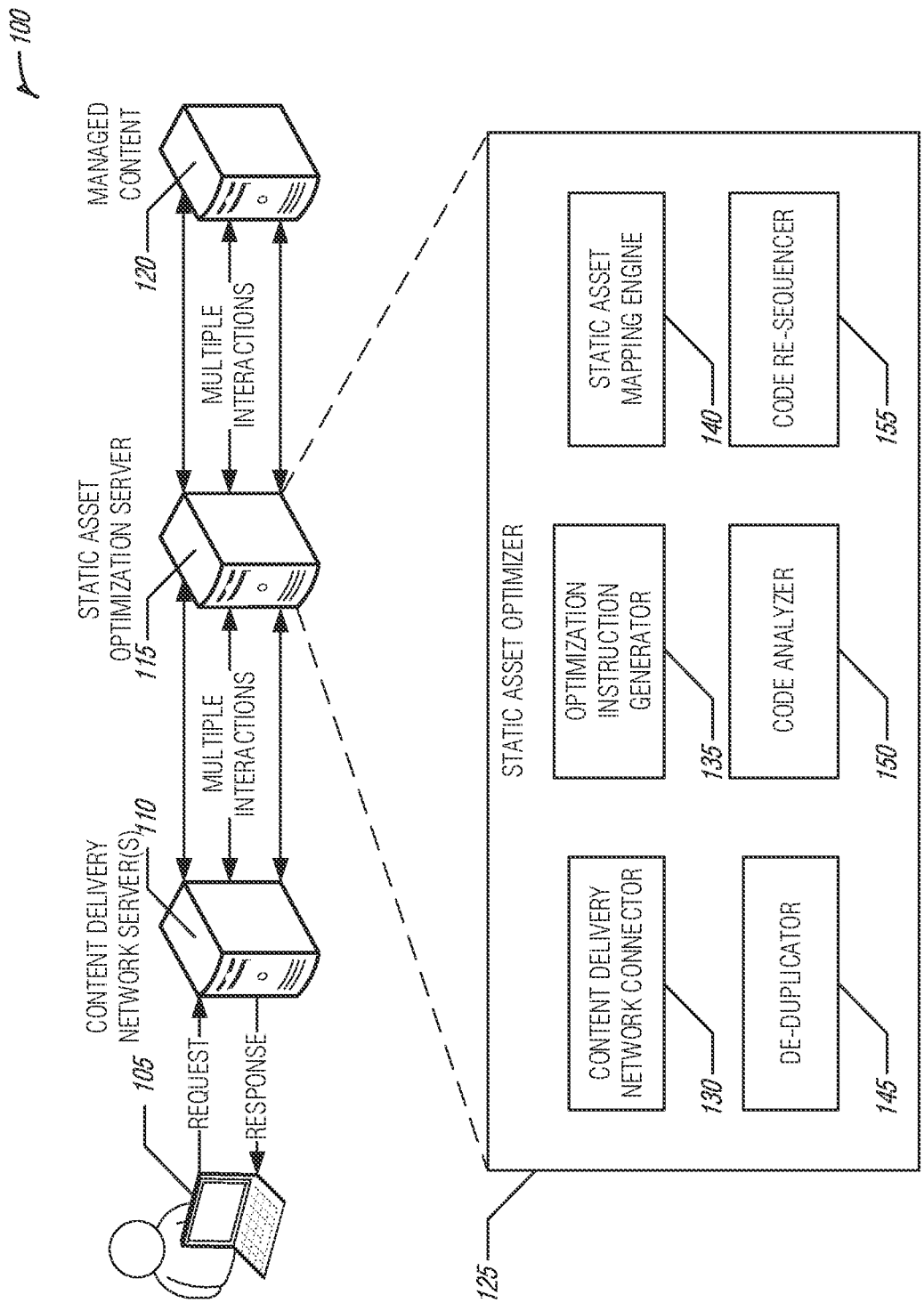
FIG. 1 is a block diagram of an example of an environment and a system for edge cache static asset optimization, according to an embodiment.

As used herein, a static asset is a webpage component that does not readily change such as, by way of example and not limitation, a JAVASCRIPT® component, a cascading style sheet (CSS) component, images, etc. For best user experiences, it is beneficial to serve webpages to a user and have them render within a web browser as fast as possible. A webpage may have a large number of content fragments per page. Each of these content fragments may be served by the same component responding with static assets that may be processed independently of other components on the page. This decouples components from one another, but this independence may duplicate assets for components that show up on a webpage more than once, especially when cached separately at a content delivery network (CDN).

There are rules that are followed by all browsers, based on the content, order, and resulting network request(s) given different HTML constructs and their order when presented to a user's browser. A number of these constructs that are supported are "blocking" resources that halt the browser in whatever it was doing and "resume" when the resource/construct has "finished." For optimal browser render performance (often referred to as "perceived page performance") all script tags (e.g., JAVASCRIPT® tags, etc.) should be placed below the page hypertext markup language (HTML) content, and all style tags (e.g., CSS tags, etc.) for content in the "above the fold" portion of the page should be at the top, with all other (below-the-fold) style tags at the bottom with the script tags. This may be best implemented in two steps. First, moving style tags up, into the head and moving script tags down after the HTML content. The first step may provide significant performance improvement. Second, prioritizing the style tags and HTML that is considered "above the fold" and moving the rest of the style tags down the page, with the script tags. The second step may provide a modest additional performance improvement.

Static Asset Deduplication

Without deduplication of assets, the content fragments would instruct the browser to load in and parse identical static assets. Each content fragment of a webpage may contain embedded components, each having their own set of assets. Removing duplicate static assets improves browser performance as these instructions generally block processing until assets are downloaded and parsed. Processing instructions to load assets that have already been loaded may block all parallel processing as the assets are reparsed and reprocessed and may result in no changes to the state of the rendered page.

There are conventional techniques for removing unnecessary static assets. However, the traditional techniques do not strip duplicate instructions to load static assets to prevent them from reaching the requestor and the content delivery network (CDN). This limits cacheability because the components may not be loaded with corresponding static assets. In addition, the conventional techniques may need to pre-compute page-specific asset bundles requiring knowledge of other component on a page that use the same static assets.

The systems and techniques described herein provide a number of benefits over conventional static asset deduplication techniques. Duplicate instructions to load static assets are re-formulated preventing them from reaching the requestor from the CDN. This improves cacheability as each component is rendered with its corresponding assets. The need to precompute page-specific asset bundles is also removed which allows for cohesive, modular components of a page to be processed and cached without knowledge of other components on the page that may use the same assets. Additionally, with the present techniques, static assets may be re-organized at the CDN to reorder the location in which the assets are loaded and parsed within a webpage. This improves browser performance as some types of assets include instructions generally that block processing until assets are parsed and rendered.

An example of a parent fragment may include:

TABLE 1

```
<esi:assign name="ASSETS" value="{}" />
<esi:eval src="/root" dca="esi" />
```

An example of content that contains instructions to load a style component included within /root:

TABLE 2

```
...
<esi:text>
   <esi:choose>
<esi:when test="$(ASSETS{'123456789'}) != 'true'">
<esi:assign name="ASSETS{'123456789'}" value="'true'" />
<link rel="stylesheet" href="https://www.webpage.com/style.css" />
</esi:when>
   </esi:choose>
</esi:text>
...
```

Static Asset Placement Optimization

A single product owner and engineering team may build an entire page (e.g., everything between a global header and footer). As such, static asset placement optimization may be done by separate engineering teams for each page individually. However, engineering teams may build relatively small components that may be slotted into a page via a page layout. They may only optimize static asset placement within their micro-view on the page within the HTML. Static asset placement may be optimized across an entire page.

In order to maintain cache-ability and performance of the page and page fragments at the edge, static asset references are moved to the top and bottom of the HTML markup as appropriate. In an example, the movement may be facilitated thorough the static asset placement instructions provided in ESIs to the edge cache server. The HTML responses from components are parsed and the script assets and asset references, style asset references, and HTML are organized into their own variables (e.g., ESI variables, etc.). The instructions are executed at the end of the process to read from these variables and place the script assets and asset references, and style asset references in their optimal locations relative to the rest of the HTML. It should be noted that maintaining order of the script assets and asset references, and style asset references is critical to maintaining proper page rendering.

A set of static asset placement instructions may be generated for execution at an edge cache server. The set of static asset placement instructions may include rules for re-sequencing code contained in a requested webpage. In an example, the set of static asset placement instructions are generated as a set of edge-side include instructions.

Webpage code may be parsed to identify a set of code feature types. In an example, the set of code feature types may include a first code feature type, a second code feature type, and a third code feature type. In an example, the first code feature type is JAVASCRIPT® code, the second code feature type is cascading style sheet code, and the third code feature type is hypertext markup language code. Other types of code or data may also be analyzed.

A processing order may be determined for the set of code feature types. For example, the ordering may be determined based on rules as indicated below in Table 3. The edge cache server may then process code feature types of the set of code feature types in the order of the reorganized webpage code. In an example, the determination of the processing order may include processing the second code feature type first, the first code feature type last, and the third code feature type after the second code feature type and before the first code feature type.

TABLE 3

| Construct/Resource Type | Optimizable |
| --- | --- |
| CSS (<link rel="stylesheet" />) | Optimizable by moving all <link> tags into the <head> for all "above the fold" content (for best results) |
| Javascript (<script src="http://.."></script>) | Optimizable by moving all <script src> tags to JUST BEFORE the </body> tag, without changing order |
| Javascript (<script>// Code here</script>) | Optimizable by moving all <script> tags to JUST BEFORE the </body> tag, without changing order |

An example of a parent page fragment that has been wrapped in instructions follows:

TABLE 4

```
<!DOCTYPE HTML>
<!-- PRE-HEAD COMMENT -->
<html lang="en-US">
<head>
    <title>Web Page: Optimized</title>
   <script>console.log("IN HEAD TAG");</script>
   <link href="css/inHeadTag.css" />
</head>
<body>
    <script>console.log("AT TOP OF BODY");</script>
    <link href="css/topOfBody.css" />
    <div>Bears</div>
    <script>console.log("AT BOTTOM OF BODY");</script>
    <link href=css/bottomOfBody.css/>
    <esi:include src=" /edge/organize/child?id=67890&optimizeStaticAssests=true" dca="esi" onerror="continue" setheader="referer: $html_encode($(PUBLIC_REQUEST_URL|' '))" ttl="12h" />
</body><!-- POST BODY COMMENTS -->
```

An example of a child fragment with rendered output of a static asset after the edge cache server using the set of asset placement instructions has resolved the embedded static asset and place another instruction to callback for the static asset follows:

TABLE 5

```
<script>console.log("AT TOP OF CHILD");</script>
<link href="css/topOfChild.css" />
<div>Beets</div>
<esi:include src=" /edge/organize/leaf?id=67890&optimizeStaticAssets=true" dca="esi" onerror="continue" ttl="12h" />
<script>console.log("AT BOTTOM OF CHILD");</script>
<link href=css/bottomOfChild.css/>
```

An example of a leaf fragment that is rendered output of an embedded static asset follows:

TABLE 6

```
<script>console.log("AT TOP OF LEAF");</script><link href="css/topOfLeaf.css" /><div>Battlestar Galactica</div><script>console.log("AT BOTTOM OF LEAF");</script><link href=css/bottomOfLeaf.css />
```

An example of an unoptimized response to a webpage request:

TABLE 7

```
<!DOCTYPE HTML>
<!-- PRE-HEAD COMMENT -->
<html lang="en-US">
<head>
<title>Webpage: Unoptimized</title>
<script>console.log("IN HEAD TAG");</script>
<link href="css/inHeadTag.css" />
</head>
<body>
<script>console.log("AT TOP OF BODY");</script>
<link href="css/topOfBody.css" />
<div>Bears</div>
<script>console.log("AT BOTTOM OF BODY");</script>
<link href=css/bottomOfBody.css/>
<script>console.log("AT TOP OF CHILD");</script>
<link href="css/topOfChild.css" />
<div>Beets</div>
<script>console.log("AT TOP OF LEAF");</script>
<link href="css/topOfLeaf.css" />
<div>Battlestar Galactica</div>
<script>console.log("AT BOTTOM OF LEAF");
</script><link href=css/bottomOfLeaf.css />
<script>console.log("AT BOTTOM OF
CHILD");</script>
```

TABLE 7-continued

```
<link href=css/bottomOfChild.css/>
</body>
<!-- POST BODY COMMENT -->
```

An example of an optimized response to a webpage request:

TABLE 8

```
<!DOCTYPE HTML>
<!-- PRE-HEAD COMMENT -->
<html lang="en-US">
<head>
<title>Webpage: Optimized</title>
<link href="css/inHeadTag.css" />
</head>
<body>
<link href="css/topOfBody.css" />
<link href=css/bottomOfBody.css />
<link href="css/topOfChild.css" />
<link href="css/topOfLeaf.css" />
<link href=css/bottomOfLeaf.css />
<link href=css/bottomOfChild.css />
<div>Bears</div>
<div>Beets</div>
<div>Battlestar Galactica</div>
<script>console.log("IN HEAD TAG");</script>
<script>console.log("AT TOP OF BODY");</script>
<script>console.log("AT BOTTOM OF BODY");</script>
<script>console.log("AT TOP OF CHILD");</script>
<script>console.log("AT TOP OF LEAF");</script>
```

TABLE 8-continued

```
<script>console.log("AT BOTTOM OF LEAF");</script>
<script>console.log("AT BOTTOM OF CHILD");</script>
</body>
<!-- POST BODY COMMENT -->
```

Below is a root fragment instruction (e.g., ESI instruction) that may be returned to the edge server to execute (this is often referred to as the "public uniform resource locator (URL)" response). Variables are defined that are initially empty that will get gradually filled in with the script assets and asset references, style asset references, and HTML markup as the edge server processes the entire session (e.g., request from the browser to response to the browser). The EDGE_PRE variable is for everything prior to and including the <body> tag. EDGE_POST is for the </body> tag and everything following. Then the values of these variables are placed in the correct (optimized) order. The basepage is stitched with an esi:eval rather than esi:include in order to block to ensure all the variables are completely populated before being read. Note that there is no rendered content in this fragment, so it may be cached at the edge for a very long time.

TABLE 9

```
<esi:assign name="EDGE_PRE" value="" />
<esi:assign name="EDGE_CSS" value="" />
<esi:asssign name="EDGE_HTML" value="" />
<esi:assign name="EDGE_JS" value="" />
<esi:assign name="EDGE_POST" value="" />
<esi:eval
src=" /edge/organize/basepage?deviceClass=$(CBA_DEVICE_CLASS|'1')
&id=12345" ttl="30h" dca="esi" maxwait="3000" onerror="continue" />
<esi:vars>$ (EDGE_PRE|' ') $ (EDGE_CSS|' ') $ (EDGE_HTML|' ') $ (EDGE_JS|'')
$ (EDGE_POST|' ')</esi:vars>
```

Below is a parent fragment that will build from the static asset basepage response. Script assets and asset references, style asset references, and other HTML have been identified and placed into the correct instruction variable assignments. The esi:text tag defers the execution of the esi:assign instruction to the parent context. The esi:include stitches in the component that returns static asset references on this page.

TABLE 10

```
<esi:text><esi:assign name="EDGE_PRE" value="$(EDGE_PRE) +
'"</esi:text><!
DOCTYPE HTML><!-- PRE-HEAD COMMENT --><html lang=
"en-US"><head><title>Webpage: Optimized</title><link
href="css/inHeadTag.css" /></head><esi:text>'" /></esi:text>
<esi:text><esi:assign name="EDGE_JS" value="$(EDGE_JS) +
'"</esi:text><script>console.log("IN HEAD
TAG");</script><esi:text>'" /></esi:text>
<esi:text><esi:assign name="EDGE_PRE" value="$(EDGE_PRE) +
'"</esi:text><body><esi:text>'" /></esi:text>
<esi:text><esi:assign name="EDGE_POST" value="$(EDGE_POST) +
'"</esi:text></body><!-- POST BODY COMMENT --
><esi:text>'" /></esi:text>
<esi:text><esi:assign name="EDGE_JS" value="$(EDGE_JS) +
'"</esi:text><script>console.log("AT TOP OF
BODY");</script><esi:text>'" /></esi:text>
<esi:text><esi:assign name="EDGE_CSS" value="$(EDGE_CSS) +
'"</esi:text><link href="css/topOfBody.css" /><esi:text>'" /></esi:text>
<esi:text><esi:assign name="EDGE_HTML" value="$(EDGE_HTML) +
'"</esi:text><div>Bears</div><esi:text>'" /></esi:text><esi:text>
<esi:assignname="EDGE_JS" value="$(EDGE_JS) +'"
</esi:text><script>console.log("AT BOTTOM OF
```

TABLE 10-continued

```
BODY");</script><esi:text>"" /></esi:text>
<esi:text><esi:assign name="EDGE_CSS" value="$(EDGE_CSS) +
"'</esi:text><link href=css/bottomOfBody.css /><esi:text>"" />
</esi:text><esi:include src=" /edge/organize/child?id=67890"
dca="esi"onerror="continue" ttl="12h" />
```

Below is a child fragment that is built from the component that returns static asset references. The script assets and asset references, style asset references, and other HTML have been detected and placed into the correct instruction variable assignments. The ESI:include stitches in the static asset embedded component into this static asset component.

TABLE 11

```
<esi:text><esi:assign name="EDGE_JS" value="$(EDGE_JS) +
"'</esi:text><script>console.log("AT TOP OF
CHILD");</script><esi:text>"" /></esi:text>
<esi:text><esi:assign name="EDGE_CSS" value="$(EDGE_CSS) +
"'</esi:text><link href="css/topOfChild.css" /><esi:text>"" /></esi:text>
<esi:text><esi:assign name="EDGE_HTML" value="$(EDGE_HTML) +
"'</esi:text><div>Beets</div><esi:text>"" /></esi:text>
<esi:include src=" /edge/organize/leaf?id=67890" dca="esi"
onerror="continue" ttl="12h" />
<esi:text><esi:assign name="EDGE_JS" value="$(EDGE_JS) +
"'</esi:text><script>console.log("AT BOTTOM OF
CHILD");</script><esi:text"" /></esi:text>
<esi:text><esi:assign name="EDGE_CSS" value="$(EDGE_CSS) +
"'</esi:text><link href=css/bottomOfChild.css /><esi:text>"" /></esi:text>
```

Below is a leaf fragment that is built from the component that returns static asset references. The script assets and asset references, style asset references, and other HTML have been detected and placed into the correct instruction variable assignments.

TABLE 12

```
<esi:text><esi:assign name="EDGE_JS" value="$(EDGE_JS) +
"'</esi:text><script>console.log("AT TOP OF
LEAF");</script><esi:text>""/></esi:text>
<esi:text><esi:assign name="EDGE_CSS" value="$(EDGE_CSS) +
"'</esi:text><link href="css/topOfLeaf.css"/><esi:text>""/></esi:text>
<esi:text><esi:assign name="EDGE_HTML" value="$(EDGE_HTML) +
"'</esi:text><div>Battlestar Galactica</div><esi:text>""/></esi:text>
<esi:text><esi:assign name="EDGE_JS" value="$(EDGE_JS) +
"'</esi:text><script>console.log("AT BOTTOM OF
LEAF");</script><esi:text>""/></esi:text>
<esi:text><esi:assign name="EDGE_CSS" value="$(EDGE_CSS) +
"'</esi:text><link href=css/bottomOfLeaf.css /><esi:text>""/></esi:text>
```

Below is the root fragment example from above after execution of esi:eval. The aggregate response of all instruction assignments contains all the script assets and asset references, style asset references, and HTML from the entire page (e.g., all components).

TABLE 13

```
<esi:assign name="EDGE_PRE" value=""""/>
<esi:assign name="EDGE_CSS" value=""""/>
<esi:assign name="EDGE_HTML" value=""""/>
<esi:assign name="EDGE_JS" value=""""/>
<esi:assign name="EDGE_POST"value=""""/>
<esi:assign name="EDGE_PRE" value="$(EDGE_PRE) + "'<!DOCTYPE
HTML>
<!-- PRE-HEAD COMMENT --><html
lang="en-US"><head><title>Webpage:
Optimized</title><link href="css/inHeadTag.css"/></head>"'"/>
<esi:assign name="EDGE_JS" value="$(EDGE_JS) +
"'<script>console.log("IN HEAD TAG");</script>"'"/>
<esi:assign name="EDGE_PRE" value="$(EDGE_PRE) + "'<body>"'"/>
```

TABLE 13-continued

```
<esi:assign name="EDGE_POST" value="$(EDGE_POST) + "'</body>
<!--POST BODY COMMENT -->"'"/>
<esi:assign name="EDGE_JS" value="$(EDGE_JS) +
"'<script>console.log("AT TOP OF BODY");</script>"'"/>
<esi:assign name="EDGE_CSS" value="$(EDGE_CSS) + "'<link
href="css/topOfBody.css"/>"'"/>
<esi:assign name="EDGE_HTML" value="$(EDGE_HTML) +
"'<div>Bears</div>"'"/>
<esi:assign name="EDGE_JS" value="$(EDGE_JS) +
"'<script>console.log("AT BOTTOM OF BODY");</script>"'"/>
<esi:assign name="EDGE_CSS" value="$(EDGE_CSS) + "'<link
href=css/bottomOfBody.css />"'"/>
<esi:assign name="EDGE_JS" value="$(EDGE_JS) +
"'<script>console.log("AT TOP OF CHILD");</script>"'"/>
<esi:assign name="EDGE_CSS" value="$(EDGE_CSS) + "'<link
href="css/topOfChild.css"/>"'"/>
<esi:ssign name="EDGE_HTML" value="$(EDGE_HTML) +
<div>Beets</div>"'"/>
<esi:assign name="EDGE_JS" value="$(EDGE_JS) +
"'<script>console.log("AT BOTTOM OF BODY");</script>"'"/>
<esi:assign name="EDGE_CSS" value="$(EDGE_CSS) + "'<link
href=css/bottomOfLeaf.css"/>"'"/>
<esi:assign name="EDGE_HTML" value="$(EDGE_HTMS) +
"'<div>Battlestar Galactica</div>"'"/>
<esi:assign name="EDGE_JS" value="$(EDGE_JS) +
"'<script>console.log("AT BOTTOM OF LEAF");</script>"'"/>
<esi:assign name="EDGE_CSS" value="$(EDGE_CSS) + "'<link
href=css/bottomOfLeaf.css />"'"/>
<esi:assign name="EDGE_JS" value="$(EDGE_JS) +
"'<script>console.log("AT BOTTOM OF CHILD");</script>"'"/>
<esi:assign name="EDGE_CSS" value="$(EDGE_CSS) + "'<link
href=css/bottomOfChild.css />"'"/>
<esi:vars>$(EDGE_PRE|' ') $ (EDGE_CSS|' ') $ (EDGE_HTML|' ') $
(EDGE_JS|' ') $ (EDGE_POST|' ')</esi:vars>
```

Static Asset Deduplication with Placement Optimization

In order to maintain cache-ability and performance of the page and page fragments at the edge, the placement of static asset references may be moved to the top and bottom of the HTML markup as appropriate and the static asset references may be deduplicated. Placement optimization and deduplication may be performed at the edge using ESI directives and logic. HTML responses from components may be parsed and the JS, CSS, and HTML components may be organized into their own ESI variables. The ESI logic that that is executed at the edge may execute at the end of the process to read from these variables and place the CSS and JS in their optimal locations relative to the rest of the HTML. It should be noted that maintaining order of the CSS and JS is critical and the techniques described herein provide an effective and efficient solutions for ensuring that component execution is optimized. One additional "master" ESI map variable may track asset references for deduplication purposes.

An example of a parent page fragment that has been wrapped in ESI instructions for follows:

TABLE 14

```
<!DOCTYPE HTML>
<!-- PRE-HEAD COMMENT -->
<html lang="en-US">
<head>
    <title>Web Page: Optimized</title>
    <script>console.log("IN HEAD TAG");</script>
    <link href="css/inHeadTag.css"/>
</head>
<body>
    <script>console.log("AT TOP OF BODY");</script>
    <link href="css/topOfBody.css"/>
    <div>Bears</div>
    <script>console.log("AT BOTTOM OF BODY");</script>
    <link href=css/bottomOfBody.css/>
```

TABLE 14-continued

```
    <esi:include
src="/edge/organize/child?id=12345&optimizeStaticAssets=true"
dca="esi" onerror="continue" setheader="referer:
$html_encode($(PUBLIC_REQUEST_URL|' '))" ttl="12h"/>
    <esi:include
src="/edge/organize/child?id=12345&optimizeStaticAssets=true"
dca="esi" onerror="continue" setheader="referer:
$html_encode($PUBLIC_REQUEST_URL|' '))" ttl="12h"/>
</body>
<!-- POST BODY COMMENT -->
```

In this example, suppose that the two components on this page are actually the "same component" but these are rendering for different products. For example, the first reference has a parameter ID of 67890 and the second reference has a parameter ID of 12345.

An example of a first child fragment for ID 67890 with rendered output of a static asset after the edge cache server using the set of asset placement instructions has resolved the embedded static asset and place another instruction to callback for the static asset follows:

TABLE 15

```
<script>console.log("AT TOP OF 67890 CHILD");</script>
<link href="css/topOfChild.css"/>
<div>Beets ID 67890</div>
<esi:include
src="/edge/organize/leaf?id=67890&optimizeStaticAssets=true" dca="esi"
onerror="continue" ttl="12h"/>
<script>console.log("AT BOTTOM OF CHILD");</script>
<link href=css/bottomOfChild.css/>
```

An example of a second child fragment for ID 12345 with rendered output of a static asset after the edge cache server using the set of asset placement instructions has resolved the embedded static asset and place another instruction to callback for the static asset follows:

TABLE 16

```
<script>console.log("AT TOP OF 12345 CHILD");</script>
<link href="css/topOfChild.css"/>
<div>Beets ID 12345</div>
<esi:include
src="/edge/organize/leaf?id=12345&optimizeStaticAssets=true" dca="esi"
onerror="continue" ttl="12h"/>
<script>console.log("AT BOTTOM OF CHILD ");</script>
<link href=css/bottomOfChild.css/>
```

An example of a first leaf fragment for ID 67890 that is rendered output of an embedded static asset follows:

TABLE 17

```
<script>console.log("AT TOP OF LEAF") ;</script><link
href="css/topOfLeaf.css"/><div>Battlestar Galactic
67890</div><script>console.log("AT BOTTOM OF LEAF")
;</script><link
href=css/bottomOfLeaf.css />
```

An example of a second leaf fragment for ID 12345 that is rendered output of an embedded static asset follows:

TABLE 18

```
<script>console.log("AT TOP OF LEAF") ;</script><link
href="css/topOfLeaf.css"/><div>Battlestar Galactica
12345</div><script>console.log("AT BOTTOM OF LEAF")
;</script><link
href=css/bottomOfLeaf.css />
```

An example of an unoptimnized response to a webpage request:

TABLE 19

```
<!DOCTYPE HTML>
<!-- PRE-HEAD COMMENT -->
<html lang="en-US">
<head>
    <title>Webpage: Unoptimized</title>
    <script>console.log("IN HEAD TAG") ;</script>
    <link href="css/inHeadTag.css"/>
</head>
<body>
    <script>console.log("AT TOP OF BODY");</script>
    <link href="css/topOfBody.css"/>
    <div>Bears</div>
    <script>console.log("AT BOTTOM OF BODY");</script>
    <link href=css/bottomOfBody.css/>
    <script>console.log("AT TOP OF 67890 CHILD");</script>
    <link href="css/topOfChild.css"/>
    <div>Beets 67890</div>
    <script>console.log("AT TOP OF LEAF");</script>
    <link href="css/topOfLeaf.css"/>
    <div>Battlestar Galactica 67890</div>
    <script>console.log("AT BOTTOM OF LEAF");
    </script><link href=css/bottomOfLeaf.css />
    <script>console.log("AT BOTTOM OF CHILD");</script>
    <link href=css/bottomOfChild.css/>
    <script>console.log("AT TOP OF 12345 CHILD");</script>
    <link href="css/topOfChild.css"/>
    <div>Beets 12345</div>
    <script>console.log("AT TOP OF LEAF");</script>
    <link href="css/topOfLeaf.css"/>
    <div>Battlestar Galactica 12345</div>
    <script>console.log("AT BOTTOM OF LEAF");
    </script><link href=css/bottomOfLeaf.css />
    <script>console.log("AT BOTTOM OF CHILD");</script>
    <link href=css/bottomOfChild.css/>
</body>
<!-- POST BODY COMMENT -->
```

An example of an optimized response to a webpage request:

TABLE 20

```
<!DOCTYPE HTML>
<!-- PRE-HEAD COMMENT -->
<html lang="en-US">
<head>
    <title>Webpage: Optimized</title>
    <link href="css/inHeadTag.css"/>
</head>
<body>
    <link href="css/topOfBody.css"/
    <link href=css/bottomOfBody.css />
    <link href="css/topOfChild.css"/>
    <link href="css/topOfLeaf.css"/>
    <link href=css/bottomOfLeaf.css />
    <link href=css/bottomOfChild.css />
    <div>Bears</div>
    <div>Beets 67890</div>
    <div>Battlestar Galactica 67890</div>
    <div>Beets 12345</div>
    <div>Battlestar Galactica 12345</div>
    <script>console.log("IN HEAD TAG");</script>
```

TABLE 20-continued

```
<script>console.log("AT TOP OF BODY");</script>
<script>console.log("AT BOTTOM OF BODY");</script>
<script>console.log("AT TOP OF 67890
CHILD");</script>
<script>console.log("AT TOP OF 12345
CHILD");</script>
<script>console.log("AT TOP OF LEAF");</script>
<script>console.log("AT BOTTOM OF LEAF");</script>
<script>console.log("AT BOTTOM OF CHILD");</script>
</body>
<!-- POST BODY COMMENT -->
```

Below is an example of ESI instructions that may be returned to the edge to execute as part of a "public URL" response. Variables are defined that are initially empty that will get gradually filled in with the JS, CSS, and HTML markup as the edge processes the entire session (request from the browser to response to the browser). The EDGE_PRE variable is for everything prior to and including the <body> tag. EDGE_POST is for the </body> tag and everything following. An ASSETS map ESI variable may be included to track assets for deduplication. Then, the values of these variables may be placed in the correct (e.g., optimized) order. The basepage may be stitched with an esi:eval rather than esi:include in order to ensure the variables are completely populated before being read. Note that there is no rendered content in this fragment, so it may be cached at the edge for a very long time.

TABLE 21

```
<esi:assign name="EDGE_PRE" value=""""/>
<esi:assign name="EDGE_CSS" value=""""/>
<esi:assign name="EDGE_HTML" value=""""/>
<esi:assign name="EDGE_JS" value=""""/>
<esi:assign name="EDGE_POST" value=""""/>
<esi:assign name="ASSETS" value="{ }" />
<esi:eval
src="/edge/organize/basepage?deviceClass=$(CBA_DEVICE_CLASS|'l')&id=12345"
ttl="30h" dca="esi" maxwait="3000" onerror="continue" />
<esi:vars>$ (EDGE_PRE|' ')$ (EDGE_CSS|' ')$ (EDGE_HTML|' ')$ (EDGE_JS|' ')$
(EDGE_POST|' ')</esi:vars>
```

Below is a parent fragment that will build from the static asset basepage response. The script assets and asset references, style asset references, and other HTML are identified and placed these into the correct instruction variable assignments. The esi:text tag defers the execution of the esi:assign instruction to the parent context. The esi:include stitches in the static asset component on this page.

TABLE 22

```
<esi:text><esi:assign name="EDGE_PRE" value="$(EDGE_PRE) +
'"</esi:text><!DOCTYPE HTML><!-- PRE-HEAD COMMENT --><html
lang="en-US"><head><title>Webpage: Optimized</title><link
href="css/inHeadTag.css"/></head><esi:text>""/></esi:text>
<esi:text>
  <esi:choose>
    <esi:when test="(ASSETS{'383690554'}) != 'true'">
      <esi:assign name="ASSETS{'38369055'}"
value="'true'" />
      <esi:assign name="EDGE_JS" value="$ (EDGE_JS) +
'"</esi:text><script>consolelog("IN HEAD TAG") ;<script><esi:text>""/>
    </esi:when>
  </esi:choose>
</esi:text>
<esi:text>
  <esi:choose>
    <esi:when test="$(ASSETS{'7483689745'}) != 'true'">
      <esi:assign name="ASSETS{'7483689745'}"
```

TABLE 22-continued

```
value="'true'" />
      <esi:assign name="EDGE_PRE" value="$(EDGE_PRE) +
'"</esi:text><body><esi:text>""/>
    </esi:when>
  </esi:choose>
</esi:text>
<esi:text>
  <esi:choose>
    <esi:when test="$(ASSETS{'687234576'}) != 'true'">
      <esi:assign name="ASSETS{'687234576'}"
value="'true'" />
      <esi:assign name="EDGE_POST"
value="$(EDGE_POST) + '"</esi:text></body><!-- POST BODY
COMMENT --><esi:text>""/>
    </esi:when>
  </esi:choose>
</esi:text>
<esi:text>
  <esi:choose>
    <esi:when test="$(ASSETS{'873659234'}) != 'true'">
      <esi:assign name="ASSETS{'873659234'}"
value="'true'" />
      <esi:assign name="EDGE_JS" value="$(EDGE_JS) +
'"</esi:text><script>console.log("AT TOP OF
BODY");</script><esi:text>""/>
    </esi:when>
  </esi:choose>
</esi:text>
<esi:text>
  <esi:choose>
    <esi:when test="$(ASSETS{'2965873453'}) != 'true'">
```

TABLE 22-continued

```
      <esi:assign name="ASSETS{'2965873453'}"
value="'true'"/>
      <esi:assign name="EDGE_CSS" value="$(EDGE_CSS) +
'"</esi:text><link href="css/topOFBody.css"/><esi:text>""/>
    </esi:when>
  </esi:choose>
</esi:text>
<esi:text>
  <esi:choose>
    <esi:when test="$(ASSETS{'876234506'}) != 'true'">
      <esi:assign name="ASSETS{'876234506'}"
value="'true'" />
      <esi:assign name="EDGE_HTML"
value="$(EDGE_HTML) + '"</esi:text><div>Bears</div><esi:text>""/>
    </esi:when>
  </esi:choose>
</esi:text>
<esi:text>
  <esi:choose>
    <esi:when test="$(ASSETS{'268934534'}) != 'true'">
      <esi:assign name="ASSETS{'268934534'}"
value="'true'" />
      <esi:assign name="EDGE_JS" value="$(EDGE_JS) +
'"</esi:text><script>console.log("AT BOTTOM OF BODY")
;</script><esi:text>""/>
    </esi:when>
  </esi:choose>
</esi:text>
```

TABLE 22-continued

```
<esi:text>
  <esi:choose>
    <esi:when test="$(ASSETS{'582398765'}) != 'true'">
      <esi:assign name="ASSETS{'582398765'}" value="'true'" />
      <esi:assign name="EDGE_CSS" value="$(EDGE_CSS) + '"</esi:text><link href="css/bottomOfBody.css" /><esi:text>"'"/>
    </esi:when>
  </esi:choose>
</esi:text>
<esi:include src="/edge/organize/child?id=67890" dca="esi" onerror="continue" ttl="12h"/>
<esi:include src="/edge/organize/child?id=12345" dca="esi" onerror="continue" ttl="12h"/>
```

Below is a first child fragment that is built from the component that returns static asset references for ID 67890. The script assets and asset references, style asset references, and other HTML are identified and placed these into the correct instruction variable assignments. The ESI:include stitches in the embedded component that returns static asset references into this static asset component.

TABLE 23

```
<esi:text>
  <esi:choose>
    <esi:when test="$(ASSETS{'18765234987'}) != 'true'">
      <esi:assign name="ASSETS{'18765234987'}" value="'true'" />
      <esi:assign name="EDGE_JS" value="$(EDGE_JS) + '"</esi:text><script>console.log("AT TOP OF 67890 CHILD");</script><esi:text>"'"/>
    </esi:when>
  </esi:choose>
</esi:text>
<esi:text>
  <esi:choose>
    <esi:when test="$(ASSETS{'28765289734'}) != 'true'">
      <esi:assign name="ASSETS{'28765289734'}" value="'true'" />
      <esi:assign name="EDGE_CSS" value="$(EDGE_CSS) + '"</esi:text><link href="css/topOfChild.css"/><esi:text>"'"/>
    </esi:when>
  </esi:choose>
</esi:text>
<esi:text>
  <esi:choose>
    <esi:when test="$(ASSETS{'37628765234'}) != 'true'">
      <esi:assign name="ASSETS{'37628765234'}" value="'true'" />
      <esi:assign name="EDGE_HTML" value="$(EDGE_HTML) + '"</esi:text><div>Beets</div><esi:text>"'"/>
    </esi:when>
  </esi:choose>
</esi:text>
<esi:include src="/edge/organize/leaf?id=67890" dca="esi" onerror="continue" ttl="12h"/>
<esi:text>
  <esi:choose>
    <esi:when test="$(ASSETS{'4876234578'}) != 'true'">
      <esi:assign name="ASSETS{'4876234578'}" value="'true'" />
      <esi:assign name="EDGE_JS" value="$(EDGE_JS) + '"</esi:text><script>console.log("AT BOTTOM OF CHILD");</script><esi:text>"'"/>
    </esi:when>
  </esi:choose>
</esi:text>
<esi:text>
  <esi:choose>
    <esi:when test="$(ASSETS{'5923786343'}) != 'true'">
      <esi:assign name="ASSETS{'5923786343'}" value="'true'" />
      <esi:assign name="EDGE_CSS" value="$(EDGE_CSS) + '"</esi:text><link href="css/bottomOfChild.css" /><esi:text>"'"/>
    </esi:when>
```

TABLE 23-continued

```
  </esi:choose>
</esi:text>
```

Below is a second child fragment that is built from the component that returns static asset references for ID 12345. Again, the script assets and asset references, style asset references, and other HTML are identified and placed these into the correct instruction variable assignments. The ESI:include stitches in the embedded component that returns static asset references into this static asset component.

TABLE 24

```
<esi:text>
  <esi:choose>
    <esi:when test="$(ASSETS{'17592397864'}) != 'true'">
      <esi:assign name="ASSETS{'17592397864'}" value="'true'" />
      <esi:assign name="EDGE_JS" value="$(EDGE_JS) + '"</esi:text><script>console.log("AT TOP OF 12345 CHILD");</script><esi:text>"'"/>
    </esi:when>
  </esi:choose>
</esi:text>
<esi:text>
  <esi:choose>
    <esi:when test="$(ASSETS{'28765289734'}) != 'true'">
      <esi:assign name="ASSETS{'28765289734'}" value="'true'" />
      <esi:assign name="EDGE_CSS" value="$(EDGE_CSS) + '"</esi:text><link href="css/topOfChild.css"/><esi:text>"'"/>
    </esi:when>
  </esi:choose>
</esi:text>
<esi:text>
  <esi:choose>
    <esi:when test="$(ASSETS{'37628765234'}) != 'true'">
      <esi:assign name="ASSETS{'37628765234'}" value="'true'" />
      <esi:assign name="EDGE_HTML" value="$(EDGE_HTML) + '"</esi:text><div>Beets</div><esi:text>"'"/>
    </esi:when>
  </esi:choose>
</esi:text>
<esi:include src="/edge/organize/leaf?id=12345" dca="esi" onerror="continue" ttl="12h"/>
<esi:text>
  <esi:choose>
    <esi:when test="$(ASSETS{'4876234578'}) != 'true'">
      <esi:assign name="ASSETS{'4876234578'}" value="'true'" />
<esi:assign name="EDGE_ JS" value="$(EDGE_JS) + '"</esi:text><script>console.log("AT BOTTOM OF CHILD");</script><esi:text>"'"/>
    </esi:when>
  </esi:choose>
</esi:text>
<esi:text>
  <esi:choose>
    <esi:when test="$(ASSETS{'5923786343'}) != 'true'">
      <esi:assign name="ASSETS{'5923786343'}" value="'true'" />
      <esi:assign name="EDGE_CSS" value="$(EDGE_CSS) + '"</esi:text><link href="css/bottomOfChild.css" /><esi:text>"'"/>
    </esi:when>
  </esi:choose>
<esi:text>
```

Below is a first leaf fragment that is built from the static asset embedded component response for ID 67890. The script assets and asset references, style asset references, and other HTML are detected and placed these into the correct instruction variable assignments.

TABLE 25

```
<esi:text>
  <esi:choose>
    <esi:when test="$(ASSETS{'1897658473'}) != 'true'">
      <esi:assign name="ASSETS{'1897658473'}" value="'true'" />
      <esi:assign name="EDGE_JS" value="$(EDGE_JS) + '"</esi:text><script>console.log("AT TOP OF LEAF");</script><esi:text>"'" />
    </esi:when>
  </esi:choose>
</esi:text>
<esi:text>
  <esi:choose>
    <esi:when test="$(ASSETS{'2879652834'}) != 'true'">
      <esi:assign name="ASSETS{'2879652834'}" value="'true'" />
      <esi:assign name="EDGE_CSS" value="$(EDGE_CSS) + '"</esi:text><link href="css/topOfLeaf.css"/><esi:text>"'" />
    </esi:when>
  </esi:choose>
</esi:text>
<esi:text>
  <esi:choose>
    <esi:when test="$(ASSETS{'3782345987'}) != 'true'">
      <esi:assign name="ASSETS{'3782345987'}" value="'true'" />
      <esi:assign name="EDGE_HTML" value="$(EDGE_HTML) + '"</esi:text><div>Battlestar Galactica 67890</div><esi:test>"'" />
    </esi:when>
  </esi:choose>
</esi:text>
<esi:text>
  <esi:choose>
    <esi:when test="$(ASSETS{'4987263454'}) != 'true'">
      <esi:assign name="ASSETS{'4987263454'}" value="'true'" />
<esi:assign name="EDGE_ JS" value="$(EDGE_JS) + '"</esi:text><script>console.log("AT BOTTOM OF LEAF");</script><esi:text>"'" />
    </esi:when>
  </esi:choose>
</esi:text>
<esi:text>
  <esi:choose>
    <esi:when test="$(ASSETS{'59234567234'}) != 'true'">
      <esi:assign name="ASSETS{'59234567234'}" value="'true'" />
      <esi:assign name="EDGE_CSS" value="$(EDGE_CSS) + '"</esi:text><link href=css/bottomOfLeft.css /><esi:text>"'" />
    </esi:when>
  </esi:choose>
</esi:text>
```

Below is a second leaf fragment that is built from the static asset embedded component response for ID 12345. The script assets and asset references, style asset references, and other HTML are detected and placed these into the correct instruction variable assignments.

TABLE 26

```
<esi:text>
  <esi:choose>
    <esi:when test="$(ASSETS{'1897658473'}) != 'true'">
      <esi:assign name="ASSETS{'1897658473'}" value="'true'" />
      <esi:assign name="EDGE_JS" value="$(EDGE_JS) + '"</esi:text><script>console.log("AT TOP OF LEAF");</script><esi:text>"'" />
    </esi:when>
  </esi:choose>
</esi:text>
<esi:text>
  <esi:choose>
    <esi:when test="$(ASSETS{'2879652834'}) != 'true'">
      <esi:assign name="ASSETS{'2879652834'}"
```

TABLE 26-continued

```
value="'true'" />
      <esi:assign name="EDGE_CSS" value="$(EDGE_CSS) + '"</esi:text><link href="css/topOfLeaf.css"/><esi:text>"'" />
    </esi:when>
  </esi:choose>
</esi:text>
<esi:text>
  <esi:choose>
    <esi:when test="$(ASSETS{'3187236489764'}) != 'true'">
      <esi:assign name="ASSETS{'3187236489764'}" value="'true'" />
      <esi:assign name="EDGE_HTML" value="$(EDGE_HTML) + '"</esi:text><div>Battlestar Galactica 12345</div><esi:test>"'" />
    </esi:when>
  </esi:choose>
</esi:text>
<esi:text>
  <esi:choose>
    <esi:when test="$(ASSETS{'4987263454'}) != 'true'">
      <esi:assign name="ASSETS{'4987263454'}" value="'true'" />
<esi:assign name="EDGE_ JS" value="$(EDGE_JS) + '"</esi:text><script>console.log("AT BOTTOM OF LEAF");</script><esi:text>"'" />
    </esi:when>
  </esi:choose>
</esi:text>
<esi:text>
  <esi:choose>
    <esi:when test="$(ASSETS{'59234567234'}) != 'true'">
      <esi:assign name="ASSETS{'59234567234'}" value="'true'" />
      <esi:assign name="EDGE_CSS" value="$(EDGE_CSS) + '"</esi:text><link href=css/bottomOfLeft.css /><esi:text>"'" />
    </esi:when>
  </esi:choose>
</esi:text>
```

FIG. 1 is a block diagram of an example of an environment 100 and a system 125 for edge cache static asset optimization, according to an embodiment. The environment 100 may include a client device 105 requesting a webpage to be delivered from content delivery network server(s) 110, a static asset optimization server 115, managed content server 120.

The static asset optimization server 115 may include a system 125. In an example, the system 125 may be a static asset optimizer. The system 125 may include a variety of components including a content delivery network connector 130, an optimization instruction generator 135, a static asset mapping engine 140, a de-duplicator 145, a code analyzer 150, and a code re-sequencer 155.

The content delivery network connector 130 may provide a connection between the static asset optimization server 115 and the content delivery network (CDN) server(s) 110. The CDN servers 110 may include a web server. CDN caching server, and any number of servers to fulfill webpage requests from the client device 105. The content delivery network connector 130 may be used to transmit instructions to the content delivery network server(s) 110 for processing webpage requests from the content delivery network and webpage caching requests to the edge. As used herein an edge cache is a cache of web content items located near a requestor. For example, the edge cache may reduce the number of network hops between a webpage requestor and the content. For example, edge-side server include (ESI) commands may be included in the instructions transmitted to the content delivery network server(s) 110 that instruct the content delivery network server(s) 110 to deduplicate static assets of a webpage and to re-sequence code contained in a webpage delivered from the edge.

The optimization instruction generator 135 may generate instructions that are configured to be executed by the content delivery network server(s) 110. A set of tracking instructions may be generated for execution at an edge cache network of the content delivery network. In an example, the instructions may be imbedded in a webpage component to be cached in the edge cache. For example, the instructions may be included in a webpage or may encapsulate a static asset call in a webpage cached in the edge cache. In an example, the set of tracking instructions may be generated as a set of edge-side include (ESI) instructions.

The code analyzer 150 may evaluate webpage content to identify code fragments, static assets, static asset references, etc. The code analyzer 150 may identify a static asset that is included in a webpage delivery session. In an example, the static asset may be identified by an asset identifier included in the edge cache. In an example, the asset identifier may be a hash for the static asset cached in the edge cache. In an example, the webpage delivery session is a current webpage delivery session. In an example, the webpage delivery session is a first session of a plurality of webpage delivery sessions.

The code analyzer 150 may determine a type for the static asset or static asset reference. For example, the static asset may be determined to be CSS. JAVASCRIPT®, HTML, etc. The code re-sequencer 155 may group the static asset with a set of other static assets based on the type. For example, CSS static assets may be grouped together. The grouped static assets may be placed together when processing the webpage to increase efficiency in page rendering. In an example, the code analyzer 150 may use multiple buffers to maintain an order of static assets, static asset references, and HTML. In another example, the optimization instruction generator 135 may generate ESI code to use multiple buffers for maintaining static asset order.

Deduplication may be completed during placement optimization to further increase the efficiency of page rendering operations. In an example, the static asset mapping engine 140 may generate instructions for generating a static asset map. In an example, the asset map contains key:value pairs. In an example, the key may be an identifier (e.g., a hash identifier) and the value may be the actual static asset or static asset reference that is to be rendered in the web browser. The static asset may be added to the static asset map. In an example, the static asset map may include Boolean values for the static assets. In an example, the static asset map may maintain a record of the static assets of the webpage and output is provided to the set of references in the static asset map. The static asset map may track static assets and duplicates of the static asset in a requested webpage. For example, during a request for a fragment of content, content containing instructions to load CSS or JAVASCRIPT® files may be wrapped with edge-side include (ESI) instructions that are used to check if the asset identifier already exists in the asset tracking map. If the asset identifier does not exist in the tracking map, then the identifier and other static asset information (e.g., key:value pair, etc.) is added to the map and the asset loading instructions are allowed to remain in place. In an example, the asset identifier may be a hash computed server-side and cached along with the instructions within an ESI fragment.

The check for whether or not the asset tracking map contains a static asset identifier (e.g., static asset hash) may be done at the ESI fragment that is the parent of other ESI includes that may contain instructions for loading JAVASCRIPT® and CSS assets. This may be done by wrapping the ESI instructions that check the static asset map in esi:text so that ESI processing only removes the esi:text tags and leave the remaining ESI instructions for later processing. The parent fragment may be set as an eval statement. The parent eval fragment may re-evaluate any remaining ESI instructions, and in the process, check and populate the asset tracking map in sequential order and leaving the first encounter of instructions loading CSS and JAVASCRIPT® in place.

The content delivery server(s) 110 may processes the webpage request by processing the static asset. In an example, the de-duplicator 145 may work in conjunction with the optimization instruction generator 135 to generate instructions for the CDN that allows the content delivery server(s) 110 to identify that a reference for the static asset in a requested webpage exists in the static asset map. Upon identifying the existence of the reference, the de-duplicator 145 may ignore (e.g., not process, etc.) additional references with the same identifier included in the set of references. This prevents multiple static asset processing events resulting in a reduction in processing time for the webpage resulting in faster webpage loading time. For example, the de-duplicator 145 may, in cooperation with the code analyzer 150 and the optimization instruction generator 135, generate instructions that allow the CDN to identify there are ten references for a script component from fragments of the webpage. The ten references may be wrapped with ESI instructions so that they may be identified at the CDN. Upon identifying that the static identifier exists in the static asset map, the additional references to static asset with the same identifier may be ignored during processing of the webpage request.

The code re-sequencer 155 may process the webpage request by processing the set of static assets or asset references. In an example, the static asset is processed according to rules corresponding to the type. For example, HTML static assets may be processed before the JAVASCRIPT® static assets, etc. The set of tracking instructions may be transmitted to the content delivery server(s) 110 via the content delivery network connector 130.

Figure 2:
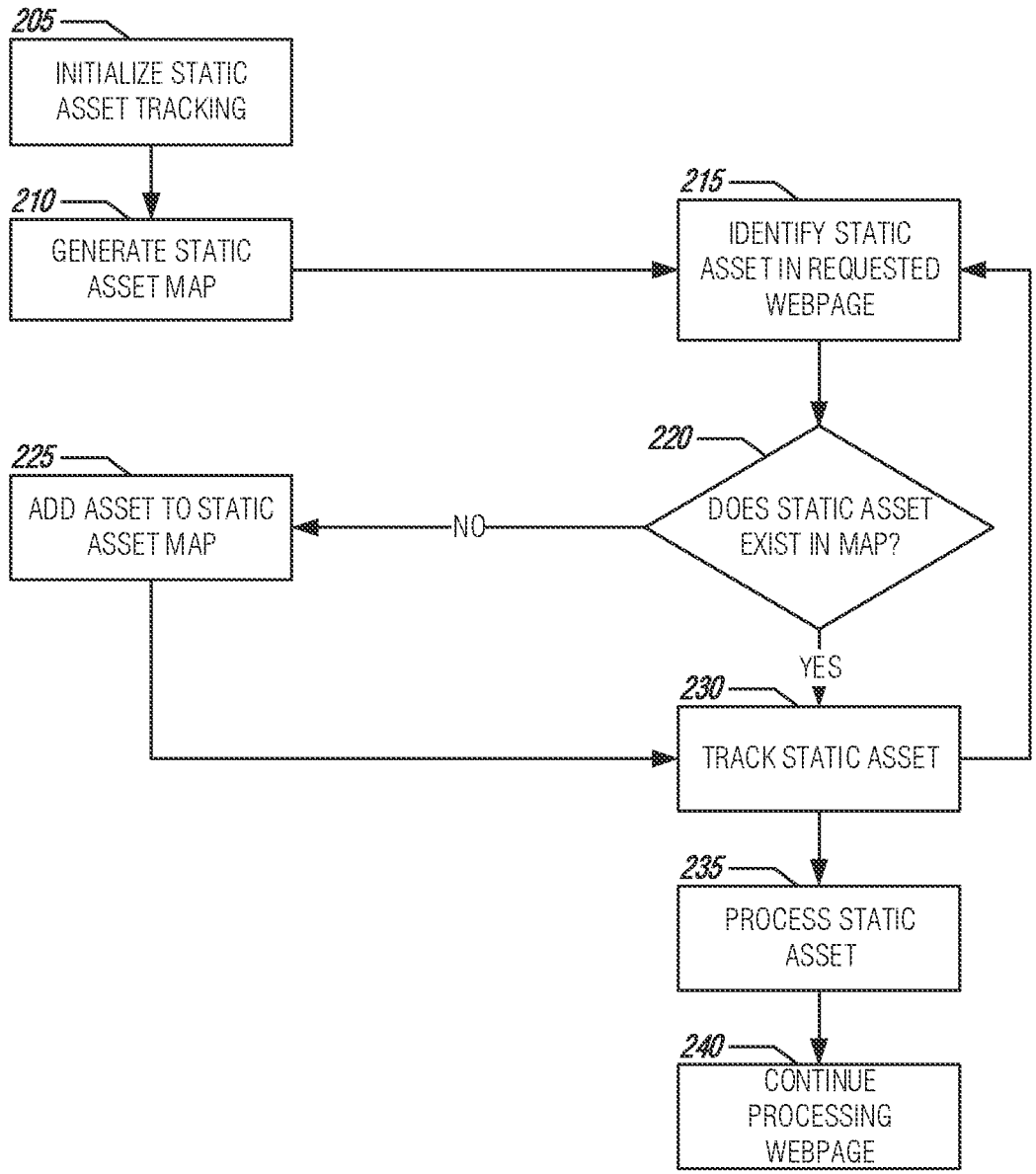
FIG. 2 illustrates a flow diagram of an example of a process for static asset deduplication for edge cache static asset optimization, according to an embodiment.

FIG. 2 illustrates a flow diagram of an example of a process 200 for static asset deduplication for edge cache static asset optimization, according to an embodiment. The process 200 may provide features as described in FIG. 1.

Static asset or static asset reference tracking may be initialized to track static assets for a webpage request session (e.g., at operation 205). A static asset may be generated that includes identifiers and references for static assets identified in the webpage request session (e.g., at operation 210). The static asset map may track the references for the static asset and placement of the references within the webpage code. A static asset or static asset reference may be identified in a requested webpage (e.g., at operation 215). The static asset may be identified by a static asset identifier included in the website code such as, for example, a hash code for the static asset. In an example, the hash code may have been generated when the static asset was wrapped in ESI code and sent to the edge. It may be determined if the static asset exists in the static asset map (e.g., at decision 220).

If the static asset does not exist in the static asset map, the static asset is added to the static asset map (e.g., at operation 225). The static asset is then tracked (e.g., at operation 230). If the static asset exists in the static asset map, the asset continues to be tracked (e.g., at operation 230). The static assets will be identified (e.g., at operation 215) and tracked (e.g., at operation 230) until all of the static assets in the webpage have been identified and mapped. The static asset is then processed (e.g., at operation 235). The processed static assets are then used to continue processing the webpage request (e.g., at operation 240).

Figure 3:
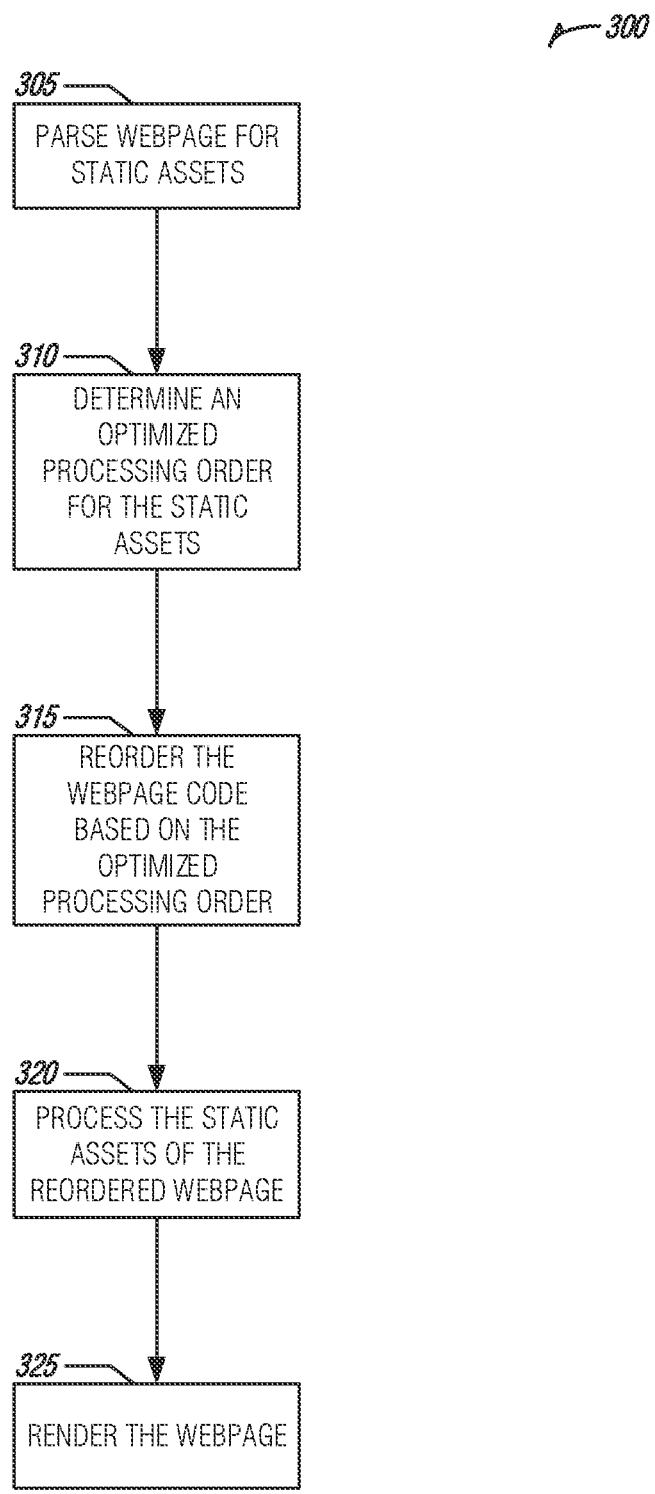
FIG. 3 illustrates a flow diagram of an example of a process for static asset re-ordering for edge cache static asset optimization, according to an embodiment.

FIG. 3 illustrates a flow diagram of an example of a process 300 for static asset re-ordering for edge cache static asset optimization, according to an embodiment. The process 300 may provide features as described in FIG. 1.

A requested webpage may be parsed to identify static assets (e.g., at operation 305). An optimized processing order may be determined for the static assets (e.g., at operation 310). Code of the webpage may be reordered based on the determined optimized processing order (e.g., at operation 315). The static assets of the reordered webpage may be processed in the optimized order e.g., at operation 320). The webpage request may then be processed using the results of processing the static assets (e.g., at operation 325).

Figure 4:
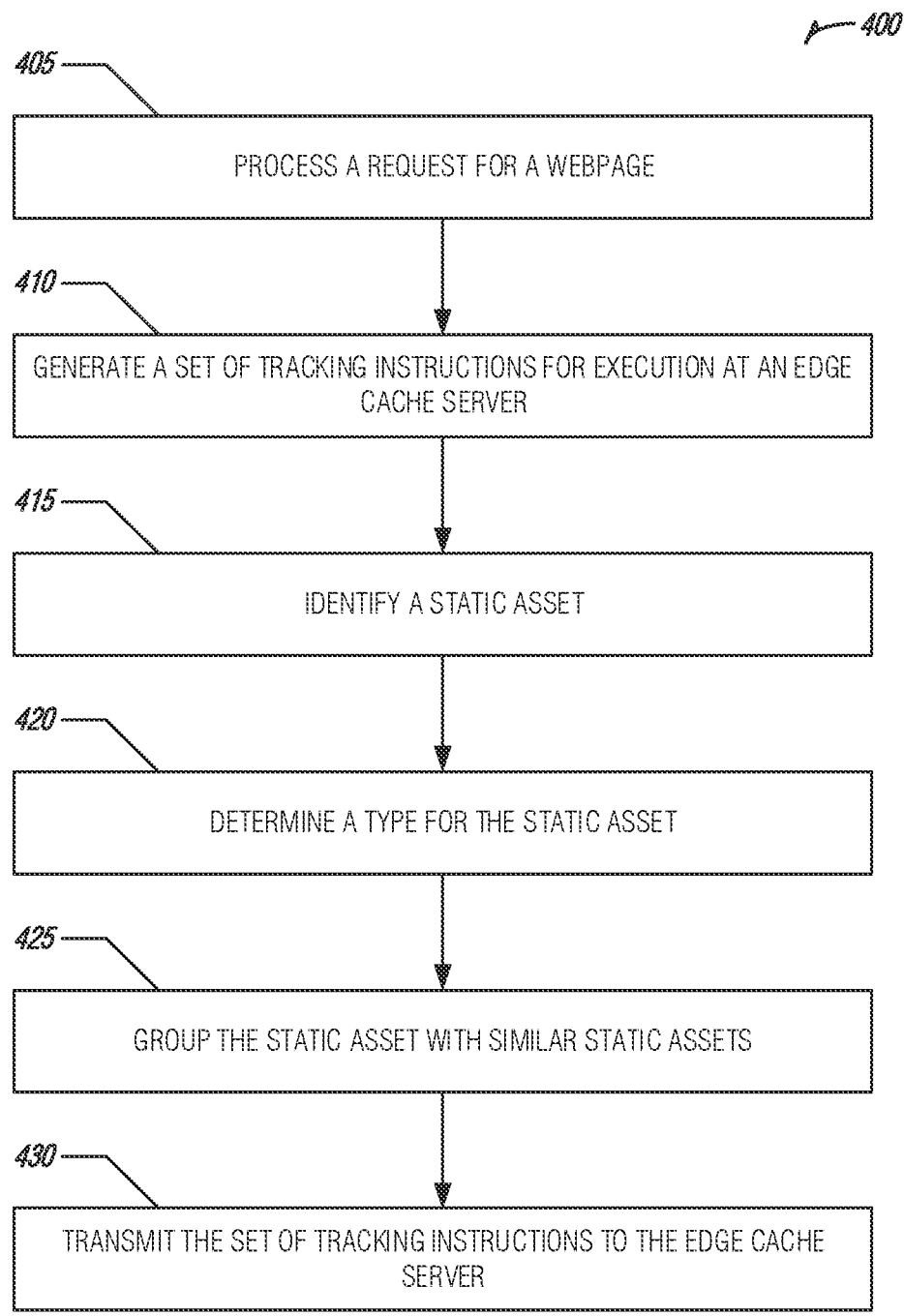
FIG. 4 illustrates an example of a method for edge cache static asset optimization, according to an embodiment.

FIG. 4 illustrates an example of a method 400 for edge cache static asset optimization, according to an embodiment. The method 400 may provide features as described in FIGS. 1-3.

A webpage request may be processed by processing references included in the webpage (e.g., at operation 405) (e.g., by the code analyzer 150 as described in FIG. 1, etc.).

A set of tracking instructions may be generated for execution at an edge cache server of the content delivery system (e.g., at operation 410) (e.g., by the optimization instruction generator 135 as described in FIG. 1, etc.). In an example, the set of tracking instructions are generated as a set of edge-side include instructions.

The set of tracking instructions may cause an edge cache server to perform a variety of operations. A static asset may be identified that is included in a webpage delivery session (e.g., at operation 415) (e.g., as specified by the code analyzer 150 as described in FIG. 1, etc.). In an example, the static asset or static asset references may be identified by an asset identifier included in the edge. In an example, the asset identifier may be a hash for the static asset. In an example, the webpage delivery session may be a current webpage delivery session. In another example, the webpage delivery session may be a first session of a plurality of webpage delivery sessions.

A type may be determined for the static asset (e.g., at operation 420) (e.g., by the code analyzer 150 as described in FIG. 1, etc.). The static asset may be grouped with a set of other static assets based on the type (e.g., at operation 425) (e.g., by the code re-sequencer 155 as described in FIG. 1, etc.).

The set of tracking instructions may be transmitted to the CDN (e.g. at operation 430) (e.g., by the content delivery network connector 130 as described in FIG. 1, etc.).

In an example, a static asset map may be generated (e.g., as specified by the static asset mapping engine 140 as described in FIG. 1, etc.). The static asset map may track assets or asset references within requested webpages. The static asset may be added to the static asset map (e.g., as specified by the static asset mapping engine 140 as described in FIG. 1, etc.). In an example, the static asset map may include a hash of the static asset or static asset reference and a Boolean value. In an example, a set of references may be identified for the static asset in a requested webpage (e.g., as specified by the code analyzer 150 as described in FIG. 1, etc.).

In an example, a set of static asset placement instructions may be generated for execution at the edge (e.g., by the optimization instruction generator 135 as described in FIG. 1, etc.). In an example, the set of static asset placement instructions may cause the edge cache server to perform a variety of operations. Webpage code may be parsed to identify a set of code feature types (e.g., as specified by the code analyzer 150 as described in FIG. 1, etc.). In an example, the set of code feature types may include a first code feature type, a second code feature type, and a third code feature type. In an example, the first code feature type is JAVASCRIPT® code, the second code feature type is cascading style sheet (CSS) code, and the third code feature type is hypertext markup language (HTML) code.

A processing order may be determined for the set of code feature types (e.g., as specified by the code re-sequencer 155 as described in FIG. 1, etc.). The webpage code may be reorganized based on the processing order (e.g., as specified by the code re-sequencer 155 as described in FIG. 1, etc.). The code feature types may be processed in an order of the re-organized webpage code (e.g., as re-organized by the de-duplicator 145 as described in FIG. 1, etc.). The set of static asset placement instructions may be transmitted to the CDN (e.g., by the content delivery network connector 130 as described in FIG. 1, etc.).

Figure 5:
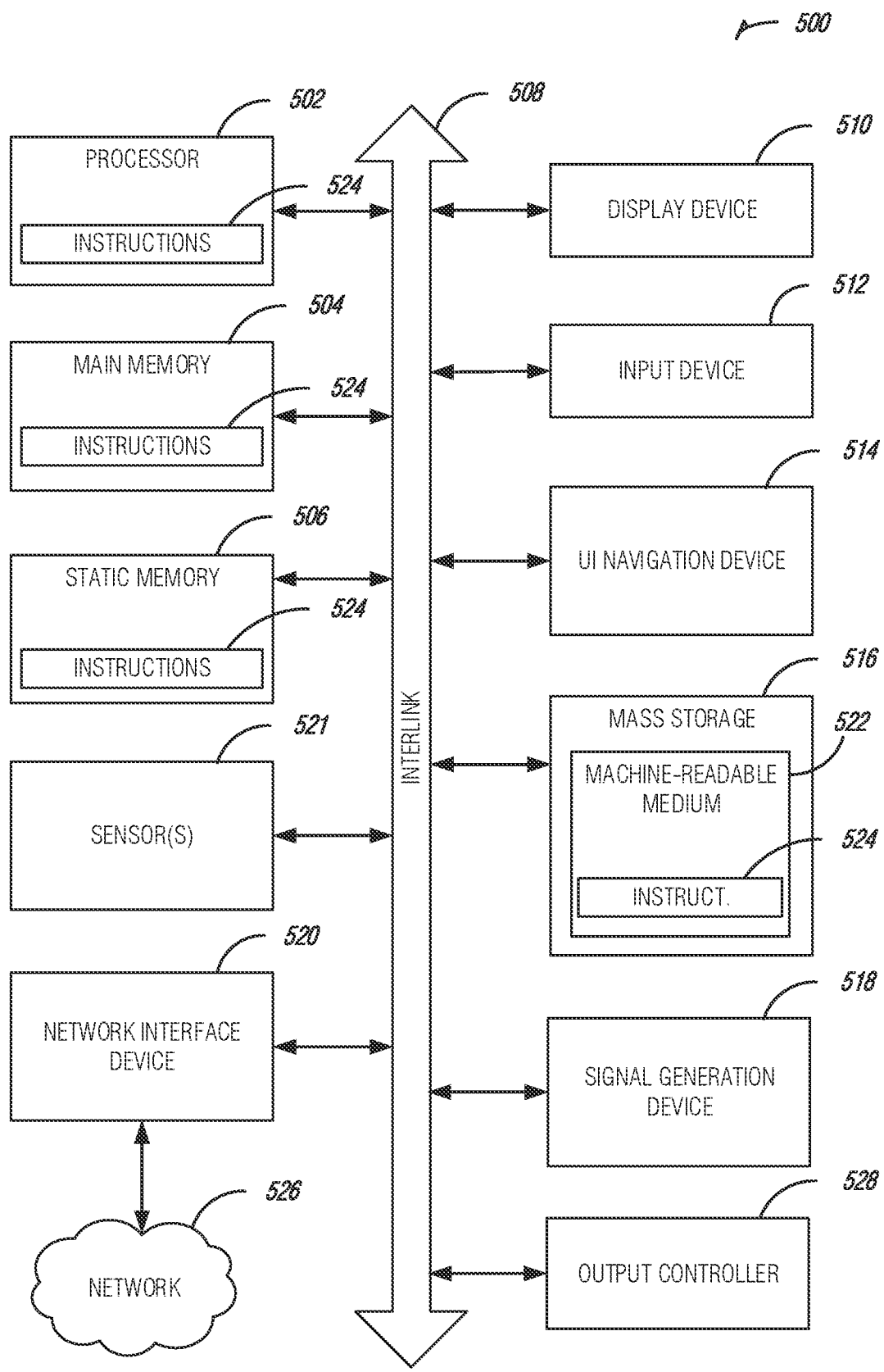
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.). IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

Example 1 is a system for static asset management in a content delivery system, the system comprising: at least one processor; and memory including instructions that, when executed by the at least one processor, cause the at least one processor to perform operations to: process a request for a webpage including asset references; identify a static asset or asset reference included in a webpage delivery session; determine a type for the static asset or asset reference; generate a set of tracking instructions for execution at an edge server of the content delivery system, the set of tracking instructions causing the edge server to: process a request for the webpage by processing the static asset or asset reference, wherein the static asset or asset reference is processed according to rules corresponding to the type; and transmit the set of tracking instructions to the edge server for storage in an edge cache of the edge network.

In Example 2, the subject matter of Example 1 includes, instructions that cause the at least one processor to: generate a static asset map, the static asset map tracking static assets or asset references within requested webpages; and add an asset identifier of the static asset or asset reference to the static asset map, wherein the set of tracking instructions include instructions to identify a set of references for the static asset or asset reference in a requested webpage, wherein an output to the set of references is generated when the webpage request is processed.

In Example 3, the subject matter of Examples 1-2 includes, wherein the set of tracking instructions are generated as a set of edge-side include instructions.

In Example 4, the subject matter of Examples 1-3 includes, wherein the static asset or asset reference is identified by an asset identifier included in an edge variable.

In Example 5, the subject matter of Example 4 includes, wherein the asset identifier is a hash for the static asset or asset reference.

In Example 6, the subject matter of Examples 1-5 includes, wherein the webpage request is processed in response to a request received in the website delivery session.

In Example 7, the subject matter of Example 6 includes, wherein the webpage delivery session is a current webpage delivery session.

In Example 8, the subject matter of Examples 6-7 includes, wherein the webpage delivery session is a first session of a plurality of webpage delivery sessions.

In Example 9, the subject matter of Examples 1-8 includes, instructions that cause the at least one processor to: group the static asset or asset reference with a set of other static assets or asset references based on the type; parse webpage code to identify a set of code feature types, the set of code feature types including a first code feature type, a second code feature type, and a third code feature type; determine a processing order for the set of code feature types; generate a set of static asset placement instructions for execution at the edge server, the set of static asset placement instructions causing the edge server to: reorganize the webpage code based on the processing order; and process code feature types of the set of code feature types in an order of the reorganized webpage code; and transmit the set of static asset placement instructions to the edge server of the content delivery system.

In Example 10, the subject matter of Example 9 includes, wherein the set of static asset placement instructions are generated as a set of edge-side include instructions.

In Example 11, the subject matter of Examples 9-10 includes, wherein the first code feature type is JavaScript code, the second code feature type is cascading style sheet code, and the third code feature type is hypertext markup language code.

In Example 12, the subject matter of Examples 9-11 includes, wherein the determination of the processing order includes processing the second code feature type first, the first code feature type last, and the third code feature type after the second code feature type and before the first code feature type.

Example 13 is at least one non-transitory machine-readable medium including instructions for static asset management in a content delivery system that, when executed by at least one processor, cause the at least one processor to perform operations to: process a request for a webpage including asset references; identify a static asset or asset reference included in a webpage delivery session; determine a type for the static asset or asset reference; generate a set of tracking instructions for execution at an edge server of the content delivery system, the set of tracking instructions causing the edge server to: process a request for the webpage by processing the static asset or asset reference, wherein the static asset or asset reference is processed according to rules corresponding to the type; and transmit the set of tracking instructions to the edge server for storage in an edge cache of the edge network.

In Example 14, the subject matter of Example 13 includes, instructions that cause the at least one processor to: generate a static asset map, the static asset map tracking static assets or asset references within requested webpages; and add an asset identifier of the static asset or asset reference to the static asset map, wherein the set of tracking instructions include instructions to identify a set of references for the static asset or asset reference in a requested webpage, wherein an output to the set of references is generated when the webpage request is processed.

In Example 15, the subject matter of Examples 13-14 includes, wherein the set of tracking instructions are generated as a set of edge-side include instructions.

In Example 16, the subject matter of Examples 13-15 includes, wherein the static asset or asset reference is identified by an asset identifier included in an edge variable.

In Example 17, the subject matter of Example 16 includes, wherein the asset identifier is a hash for the static asset or asset reference.

In Example 18, the subject matter of Examples 13-17 includes, wherein the webpage request is processed in response to a request received in the website delivery session.

In Example 19, the subject matter of Example 18 includes, wherein the webpage delivery session is a current webpage delivery session.

In Example 20, the subject matter of Examples 18-19 includes, wherein the webpage delivery session is a first session of a plurality of webpage delivery sessions.

In Example 21, the subject matter of Examples 13-20 includes, instructions that cause the at least one processor to: group the static asset or asset reference with a set of other static assets or asset references based on the type; parse webpage code to identify a set of code feature types, the set of code feature types including a first code feature type, a second code feature type, and a third code feature type; determine a processing order for the set of code feature types: generate a set of static asset placement instructions for execution at the edge server, the set of static asset placement instructions causing the edge server to: reorganize the webpage code based on the processing order; and process code feature types of the set of code feature types in an order of the reorganized webpage code; and transmit the set of static asset placement instructions to the edge server of the content delivery system.

In Example 22, the subject matter of Example 21 includes, wherein the set of static asset placement instructions are generated as a set of edge-side include instructions.

In Example 23, the subject matter of Examples 21-22 includes, wherein the first code feature type is JavaScript code, the second code feature type is cascading style sheet code, and the third code feature type is hypertext markup language code.

In Example 24, the subject matter of Examples 21-23 includes, wherein the determination of the processing order includes processing the second code feature type first, the first code feature type last, and the third code feature type after the second code feature type and before the first code feature type.

Example 25 is a method for static asset management in a content delivery system, the method comprising: processing a request for a webpage including asset references; identifying a static asset or asset reference included in a webpage delivery session; determining a type for the static asset or asset reference; generating a set of tracking instructions for execution at an edge server of the content delivery system, the set of tracking instructions causing the edge server to: process a request for the webpage by processing the static asset or asset reference, wherein the static asset or asset reference is processed according to rules corresponding to the type; and transmitting the set of tracking instructions to the edge server for storage in an edge cache of the edge network.

In Example 26, the subject matter of Example 25 includes, generating a static asset map, the static asset map tracking static assets or asset references within requested webpages; and adding an asset identifier of the static asset or asset reference to the static asset map, wherein the set of tracking instruction includes instructions to identify a set of references for the static asset or asset reference in a requested webpage, wherein an output to the set of references is generated when the webpage request is processed.

In Example 27, the subject matter of Examples 25-26 includes, wherein the set of tracking instructions are generated as a set of edge-side include instructions.

In Example 28, the subject matter of Examples 25-27 includes, wherein the static asset or asset reference is identified by an asset identifier included in an edge variable.

In Example 29, the subject matter of Example 28 includes, wherein the asset identifier is a hash for the static asset or asset reference.

In Example 30, the subject matter of Examples 25-29 includes, wherein the webpage request is processed in response to a request received in the website delivery session.

In Example 31, the subject matter of Example 30 includes, wherein the webpage delivery session is a current webpage delivery session.

In Example 32, the subject matter of Examples 30-31 includes, wherein the webpage delivery session is a first session of a plurality of webpage delivery sessions.

In Example 33, the subject matter of Examples 25-32 includes, grouping the static asset or asset reference with a set of other static assets or asset references based on the type; parsing webpage code to identify a set of code feature types, the set of code feature types including a first code feature type, a second code feature type, and a third code feature type; determining a processing order for the set of code feature types; generating a set of static asset placement instructions for execution at the edge server, the set of static asset placement instructions causing the edge server to: reorganize the webpage code based on the processing order; and process code feature types of the set of code feature types in an order of the reorganized webpage code; and transmitting the set of static asset placement instructions to the edge server of the content delivery system.

In Example 34, the subject matter of Example 33 includes, wherein the set of static asset placement instructions are generated as a set of edge-side include instructions.

In Example 35, the subject matter of Examples 33-34 includes, wherein the first code feature type is JavaScript code, the second code feature type is cascading style sheet code, and the third code feature type is hypertext markup language code.

In Example 36, the subject matter of Examples 33-35 includes, wherein determining the processing order includes processing the second code feature type first, the first code feature type last, and the third code feature type after the second code feature type and before the first code feature type.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A." and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for static asset management in content delivery system, the system comprising:
   at least one processor; and
   memory including instructions that, when executed by the at least one processor, cause the at least one processor to perform operations to:
   process a request for a webpage that includes asset references;

identify a static asset or asset reference included in a webpage delivery session;

parse code of the webpage to identify instances of the static asset or asset reference in the webpage;

obtain instructions for loading the instances of the static asset or asset reference;

reformulate the instructions for loading the static asset or asset reference as a single loading instruction, the single loading instruction to be executed once to load the static asset or asset reference for the instances of the static asset or asset reference; and transmit the single loading instruction to an edge server for storage in an edge cache of the content delivery system for each instance of the static asset or asset reference.

2. The system of claim 1, further comprising instructions that cause the at least one processor to:

parse code of the webpage to identify a set of code feature types, the set of code feature types including a first code feature type, a second code feature type, and a third code feature type;

group the static asset or asset reference with a set of other static assets or asset references based on the set of code feature types;

determine a processing order for the set of code feature types;

generate a set of tracking instructions for execution at the edge server of the content delivery system, the set of tracking instructions causing the edge server to process a request for the webpage by processing the static asset or asset reference, wherein the static asset or asset reference is processed according to rules corresponding to a code feature type of the set of code feature types; and transmit the set of tracking instructions to the edge server for storage in the edge cache of the content delivery system.

3. The system of claim 2, wherein the determination of the processing order includes processing the second code feature type first, the first code feature type last, and the third code feature type after the second code feature type and before the first code feature type, and wherein the first code feature type is JavaScript code, the second code feature type is cascading style sheet code, and the third code feature type is hypertext markup language code.

4. The system of claim 1, further comprising instructions that cause the at least one processor to:

generate a set of static asset placement instructions for execution at, the edge server, the set of static asset placement instructions causing the edge server to:

reorganize the webpage code based on the processing order; and process code feature types of the set of code feature types in an order of the reorganized webpage code; and transmit the set of static asset placement instructions to the edge server for storage in the edge cache of the content delivery system.

5. The system of claim 1, further comprising instructions that cause the at least one processor to:

generate a static asset map, the static asset map tracking static assets or asset references within requested webpages;

add an asset identifier of the static asset or asset reference to the static asset map; and generate a set of tracking instructions that identify a set of references for the static asset or asset reference in a requested webpage, wherein the instances of the static asset or asset reference are identified using the set of references.

6. The system of claim 1, wherein the single loading instruction is generated as an edge-side include instruction.

7. The system of claim 1, wherein the instances of the static asset or asset reference include a parent code fragment and child code fragments of the parent code fragment and further comprising wrapping the parent code fragment and the child code fragments with the single loading instruction.

8. At least one non-transitory machine-readable medium including instructions for static asset management in a content delivery system that, when executed by at least one processor, cause the at least one processor to perform operations to:

process a request for a webpage that, includes asset, references;

identify a static asset or asset reference included in a webpage delivery session;

parse code of the webpage to identify instances of the static asset or asset reference in the webpage;

obtain instructions for loading the instances of the static asset or asset reference;

reformulate the instructions for loading the static asset or asset reference as a single loading instruction, the single loading instruction to be executed once to load the static asset or asset reference for the instances of the static asset or asset, reference; and transmit the single loading instruction to an edge server for storage in an edge cache of the content delivery system for each instance of the static asset or asset reference.

9. The at least one non-transitory machine-readable medium of claim 8, further comprising instructions that cause the at least one processor to:

parse code of the webpage to identify a set of code feature types, the set of code feature types including a first code feature type, a second code feature type, and a third code feature type;

group the static asset or asset reference with a set of other static assets or asset references based on the set of code feature types;

determine a processing order for the set of code feature types;

generate a set of tracking instructions for execution at the edge server of the content delivery system, the set of tracking instructions causing the edge server to process a request for the webpage by processing the static asset or asset reference, wherein the static asset or asset reference is processed according to rules corresponding to a code feature type of the set of code feature types; and transmit the set of tracking instructions to the edge server for storage in the edge cache of the content delivery system.

10. The at least one non-transitory machine-readable medium of claim 9, wherein the determination of the processing order includes processing the second code feature type first, the first code feature type last, and the third code feature type after the second code feature type and before the first code feature type, and wherein the first code feature type is JavaScript code, the second code feature type is cascading style sheet code, and the third code feature type is hypertext markup language code.

11. The at least one non-transitory machine-readable medium of claim 9, further comprising instructions that cause the at least one processor to:
    generate a set of static asset placement instructions for execution at the edge server, the set of static asset placement instructions causing the edge server to:
    reorganize the webpage code based on the processing order; and
    process code feature types of the set of code feature types in an order of the reorganized webpage code; and
    transmit the set of static asset placement instructions to the edge server for storage in the edge cache of the content delivery system.

12. The at least one non-transitory machine-readable medium of claim 8, further comprising instructions that cause the at least one processor to:
    generate a static asset map, the static asset map tracking static assets or asset references within requested webpages;
    add an asset identifier of the static asset or asset reference to the static asset map; and
    generate a set of tracking instructions that identify a set of references for the static asset or asset reference in a requested webpage, wherein the instances of the static asset or asset reference are identified using the set of references.

13. The at least one non-transitory machine-readable medium of claim 8, wherein the single loading instruction is generated as an edge-side include instruction.

14. The at least one non-transitory machine-readable medium of claim 8, wherein the instances of the static asset or asset reference include a parent code fragment and child code fragments of the parent code fragment and further comprising wrapping the parent, code fragment and the child code fragments with the single loading instruction.

15. A method for static asset management in a content delivery system, the method comprising:
    processing a request for a webpage that includes asset references;
    identifying a static asset or asset reference included in a webpage delivery session;
    parsing code of the webpage to identify instances of the static asset or asset reference in the webpage;
    obtaining instructions for loading the instances of the static asset or asset reference;
    reformulating the instructions for loading the static asset or asset reference as a single loading instruction, the single loading instruction to be executed once to load the static asset or asset reference for the instances of the static asset or asset reference; and
    transmitting the single loading instruction to an edge server for storage in an edge cache of the content delivery system for each instance of the static asset or asset reference.

16. The method of claim 15, further comprising:
    parsing code of the webpage to identify a set of code feature types, the set of code feature types including a first code feature type, a second code feature type, and a third code feature type;
    grouping the static asset or asset reference with a set of other static assets or asset references based on the set of code feature types;
    determining a processing order for the set of code feature types;
    generating a set of tracking instructions for execution at the edge server of the content delivery system, the set of tracking instructions causing the edge server to process a request for the webpage by processing the static asset or asset reference, wherein the static asset, or asset reference is processed according to rules corresponding to a code feature type of the set of code feature types; and
    transmitting the set of tracking instructions to the edge server for storage in the edge cache of the content delivery system.

17. The method of claim 16, wherein determining the processing order includes processing the second code feature type first, the first code feature type last, and the third code feature type after the second code feature type and before the first code feature type, and wherein the first code feature type is JavaScript code, the second code feature type is cascading style sheet code, and the third code feature type is hypertext markup language code.

18. The method of claim 16, further comprising:
    generating a set of static asset placement instructions for execution at the edge server, the set of static asset placement instructions causing the edge server to:
    reorganizing the webpage code based on the processing order; and
    processing code feature types of the set of code feature types in an order of the reorganized webpage code; and
    transmitting the set of static asset placement instructions to the edge server for storage in the edge cache of the content delivery system.

19. The method of claim 15, further comprising:
    generating a static asset map, the static asset map tracking static assets or asset references within requested webpages;
    adding an asset identifier of the static asset or asset reference to the static asset map; and
    generating a set of tracking instructions that identify a set of references for the static asset or asset reference in a requested webpage, wherein the instances of the static asset or asset reference are identified using the set of references.

20. The method of claim 15, wherein the single loading instruction is generated as an edge-side include instruction.

21. The method of claim 15, wherein the instances of the static asset or asset reference include a parent code fragment and child code fragments of the parent code fragment and further comprising wrapping the parent code fragment and the child code fragments with the single loading instruction.

* * * * *